United States Patent
Boyd et al.

(10) Patent No.: US 7,565,634 B1
(45) Date of Patent: Jul. 21, 2009

(54) MASSIVELY PARALLEL BOOLEAN SATISFIABILITY IMPLICATION CIRCUIT

(75) Inventors: Mark J. Boyd, Santa Cruz, CA (US); Tracy Larrabee, Santa Cruz, CA (US)

(73) Assignee: The Regents of the University of California, Santa Cruz, Oakland, CA (US)

( * ) Notice: Subject to any disclaimer, the term of this patent is extended or adjusted under 35 U.S.C. 154(b) by 367 days.

(21) Appl. No.: 11/255,092

(22) Filed: Oct. 20, 2005

Related U.S. Application Data

(60) Provisional application No. 60/620,873, filed on Oct. 20, 2004.

(51) Int. Cl.
*G06F 17/50* (2006.01)
*G06F 9/45* (2006.01)
*H03K 11/693* (2006.01)

(52) U.S. Cl. .................. 716/5; 716/2; 716/4; 716/16
(58) Field of Classification Search .............. 716/2, 716/4–5, 16
See application file for complete search history.

(56) References Cited

U.S. PATENT DOCUMENTS

| | | | |
|---|---|---|---|
| 6,247,164 B1* | 6/2001 | Ashar et al. ............... 716/5 |
| 6,292,916 B1* | 9/2001 | Abramovici et al. ........ 714/736 |
| 6,415,430 B1* | 7/2002 | Ashar et al. ............... 716/18 |
| 2003/0182641 A1* | 9/2003 | Yang ........................ 716/4 |
| 2004/0236545 A1* | 11/2004 | Arroyo-Figueroa ......... 703/2 |

OTHER PUBLICATIONS

Boyd, Mark; A Scalable, Loadable Custom Programmable Logic Device for Solving Boolean Satisfiability Problems; 2000; IEEE/University of California Department of Computer Engineering; pp. 13-18.*

* cited by examiner

*Primary Examiner*—Jack Chiang
*Assistant Examiner*—Suresh Memula
(74) *Attorney, Agent, or Firm*—Lumen Patent Firm

(57) ABSTRACT

The application concerns prototyped custom Programmable Logic Devices (Pills) for Boolean satisfiability (SAT) problems. This approach is based on the use of clause evaluation circuits (CECs), which indicate whether or not a single variable of the clause is asserted by the clause, and variable evaluation circuits (VECs), which identify the asserted variable of a clause having exactly one variable asserted by the clause. Scaling is provided by the use of partial CEC and VEC circuits.

10 Claims, 7 Drawing Sheets

US 7,565,634 B1

MASSIVELY PARALLEL BOOLEAN SATISFIABILITY IMPLICATION CIRCUIT

RELATED APPLICATION

This application claims priority based upon Provisional Patent Application No. 60/620,873, filed on Oct. 20, 2004.

TECHNICAL FIELD

The present invention generally relates to custom programmable logic device. More particularly, the present invention relates to a custom programmable logic device capable of partitioning, constructing and wiring multiple circuits on different microchips in order to efficiently load formulas and on-line clause addition with no instance-specific placement or routing.

BACKGROUND ART

Boolean satisfiability (SAT) is known in the prior art as an important HP-hard problem with significant commercial CAD and test applications, which include automated timing verification, automated layout, automated routability analysis, logic minimization and automated test pattern generation.

DISCLOSURE OF THE INVENTION

Prior art attempts to improve the performance of solving SAT problems in general-purpose processors focused on backtracking through truth assignments, pruning the search space through clause addition, partitioning the problem into smaller subproblems and using heuristics for ordering evaluations.

Further, in the prior art, attempts at solving SAT in reconfigurable hardware have implemented massive, fine grained parallelism which evaluates all direct transitive implications in a single cycle. This parallel approach solves DIMACS benchmark problems faster than the best software approaches, such as GRASP, often by several orders of magnitude. However, a significant disadvantage of this type of approach is the instance-specific placement and routing compilation required for each new formula, which commonly requires significantly more effort than the execution time of the machine itself. Thus, there is a need to solve boolean satisfiability which avoids the disadvantages of the prior art.

The present invention satisfies the needs discussed above. The present invention generally relates to custom programmable logic device. More particularly, the present invention relates to a custom programmable logic device capable of partitioning, constructing and wiring multiple circuits on different microchips in order to efficiently load formulas and on-line clause addition with no instance-specific placement or routing. One aspect of the present invention provides for a custom programmable logic device capable of partitioning, constructing and wiring multiple circuits on different microchips. This aspect can ensure the number of signals required for input/output from each microchip does not exceed a set number of inputs. This input can include Clause Evaluation Circuits (CECs) and Variable Evaluation Circuits (VECs).

BRIEF DESCRIPTION OF THE DRAWING(S)

For a better understanding of the present invention, reference is made to the below referenced accompanying Drawing(s). Reference numbers refer to the same or equivalent parts of the present invention throughout the several figures of the Drawing(s).

MODES FOR CARRYING OUT THE INVENTION

Figure 1:
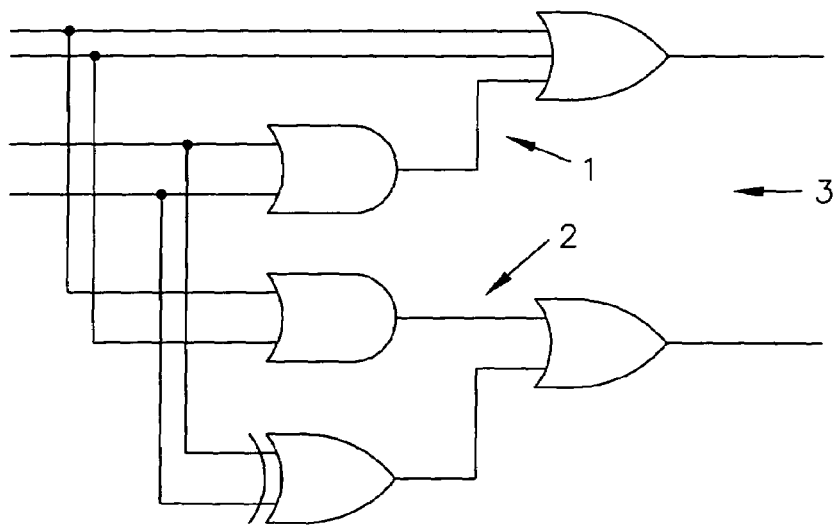
FIG. 1 is a diagram of a 2 bit adder as used in the encoder of an embodiment in accordance with the present invention.

ELVIS (Easily Loaded Variable Implication Solver) is a static PLD design that quickly loads any formula and evaluates and transmits multiple transitive implications of a partial truth assignment in one cycle. This massive, fine-grained parallelism, both in the calculation of implications and their broadcast to every clause in the following cycle, is the core improvement provided by this approach.

The intuition behind ELVIS is fairly clever. First, notice that for any given clause, it may or may not have a transitively implied literal, depending on the values of the other literals in the clause. To determine this, for each clause, a Clause Evaluation Circuit (CEC) forwards a result of 1 if exactly one literal is implied. For each literal, a Variable Evaluation Circuit (VEC) takes the CEC result from each clause and determines if the literal is implied. How is this possible? Since all we know is that some literal in the clause is implied, how do we know that this particular literal is implied?

The key point is that the literal circuit also requires another input: the value of its complement. By comparing that value to the results from the clause circuits, we can determine if this particular literal is implied. This is the crucial result. Take the clause (A+B+C). Assume we know that exactly one literal is implied. This means that exactly two of the literals in the clause have their complements asserted. How can we tell if A is the implied literal? Check to see if A is asserted. If A is not asserted, B and C must be asserted, and therefore A is the implied literal. On the other hand, if A is asserted, then B or C is implied, since one of them is the single free literal. Another way to look at it is by analogy. The befuddled chairman of the department calls a meeting to determine who will write a very long report required by the university president. Although ten professors were supposed to attend, the chairman only counted nine showing up. A week later the chairman sends out a message: "if you didn't show up to the meeting last week, you were the only one, so you get to write the report." The chairman had the ambiguous information that exactly one professor was missing (like the CEC). He sends this information to all ten professors, and they compare it to their individual knowledge of their attendance. The one that missed the meeting is implied as the sole report writer. This technique results in a two level design. The first level is the CEC circuitry, and the second is the VEC level. These logical levels are fairly close to the AND-OR design of a traditional PLD. The main differences which make ELVIS distinct are two novel design implementations: custom encoders instead of AND-OR logic levels and loadable bus masks instead of antifuse routing. Both are described in detail in the following subsections. The first two subsections outline the primitive logical components of the ONEACI encoder and the bus mask. The second two subsections describe how these components are used to make the CEC and VEC circuits.

FIG. 1 is a diagram of a 2 bit adder as used in the encoder of an embodiment in accordance with the present invention. The specialized encoder, ONEACT, recognizes when exactly one of p inputs is active, meaning that there is a transitively implied literal in the clause. This design differs from previous work in that the ONEACT doesn't tell which literal is implied. It only tells that all but one of the literals in the clause are dead, since their complements are asserted. Each encoder 3 is made up of cascaded 2-bit adders 1, 2, shown in FIG. 1. Encoder 3 sums all of the bus lines, encoding the sum with two bits, and forwards the sum up to a maximum of 3. O indicates the clause is false (since all of the literals have their complements asserted, and are dead), 1 indicates a single implied literal (all literals are dead except one that is free and "active"), 2 and 3 indicate the clause has more free variables.

Figure 2:
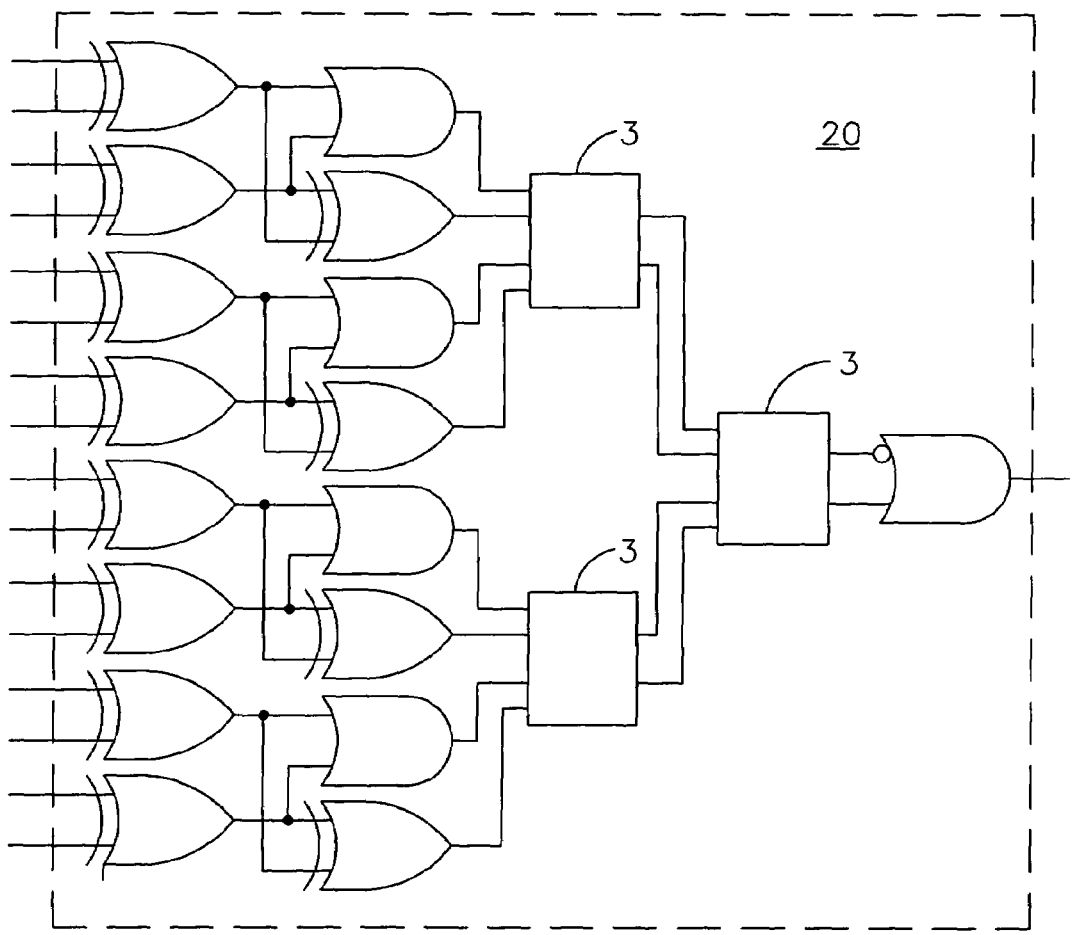
FIG. 2 is a diagram of a 16 input ONEACT encoder of an embodiment in accordance with the present invention.

FIG. 2 is a diagram of a 16 input ONEACT encoder 20 of an embodiment in accordance with the present invention. Each encoder requires n/4-1 custom adders, and therefore has $\Theta(n)$ space complexity and a fan-in latency of $\Theta(\log n)$, as illustrated in FIG. 2.

Figure 3:
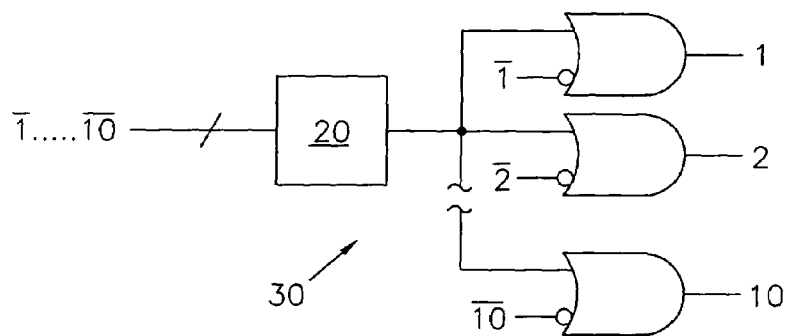
FIG. 3 is a diagram of a ELVIS implication logic for the clause (10+9+8+7+6+5+4+3+2+1) from hole 10 in an embodiment in accordance with the present invention.

FIG. 3 is a diagram of a ELVIS implication logic 30 for the clause (10+9+8+7+6+5+4+3+2+1) from hole 10 in an embodiment in accordance with the present invention. Such an encoder can be used efficiently as implication logic. It should be clear that if literals 1 through 9 are asserted, but not TO, the output of ONEACT is true. Since TO is false, this then implies the literal 10. Compare the amount of logic used to that in the prior art. The logic is significantly less, by a factor of n. The key observation here is that we can unite the ambiguous information that some complementation is not asserted with the specific knowledge that a particular variable's complement is not asserted to conclude that the variable is implied. By allowing the ambiguity, ELVIS does not need to create a separate, redundant clause implication circuit for each literal. Compare this to prior art, which requires $\Theta(n^2)$ gates, each ELVIS ONEACT encoder uses $\Theta>(n)$ gates. This technique can clearly be used with any previous design to reduce logic and routing requirements, however, instance-specific routing would still be needed.

Figure 4:
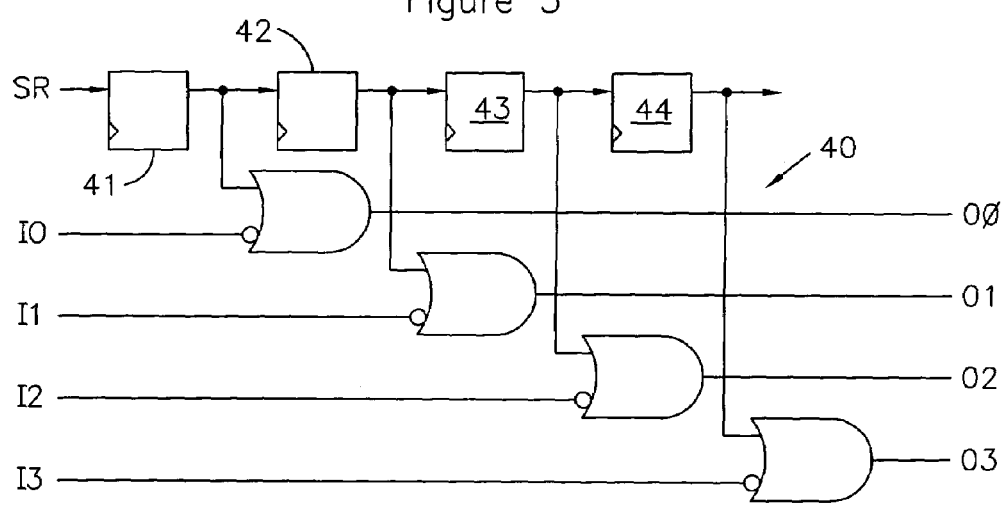
FIG. 4 is a diagram of a loadable bus mask as used in the encoder of an embodiment in accordance with the present invention.

FIG. 4 is a diagram of a loadable bus mask 40 as used in the encoder of an embodiment in accordance with the present invention. The second novel design implementation, the bus mask illustrated in FIG. 4, solves this problem. The solution to the problem of routing is solved by routing ALL of the signals to each component that may need them, and then filtering out the unneeded signals. This is accomplished by the use of a loadable bus mask, which accepts all of the lines of a bus as input, and filters the unused signals.

Loading ELVIS with the SAT-formula requires a bit stream loaded into a shift register 41-44. This shift register acts as a mask for values entering the evaluation circuit through the bus. FIG. 4 shows how a four-line bus is masked so that only the inverted values of the 10 and 13 lines are allowed to propagate. This is analogous to performing a bitwise AND between a register and an inverted input, hence the inputs not allowed to be controlling are masked. This loadable bus mask allows fast formula loading and clause modification. It also supports an unbounded number of literals in a clause, and an unbounded number of occurrences of a particular literal throughout the formula.

Figure 5:
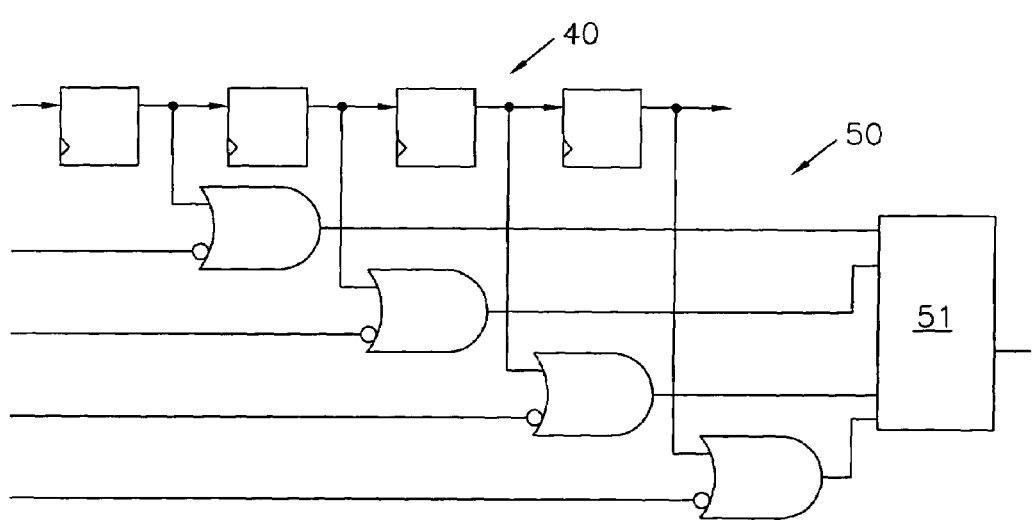
FIG. 5 is a diagram of a clause evaluation circuit as used in the encoder of an embodiment in accordance with the present invention.

FIG. 5 is a diagram of a clause evaluation circuit (CEC) as used in the encoder of an embodiment in accordance with the present invention. A CEC evaluates each clause. Each CEC uses a bus mask 40 and a ONEACT encoder 51 to determine if exactly one literal complementation has not been asserted. An example for a four line bus is shown as FIG. 5. In other words, a clause with 4 literals, such as (A+B+C+D) united together with the partial truth assignment [A=O, B=O], becomes (F+F+C+D) and has two literal complementations not yet asserted, so the CEC output is 0.

Figure 6:
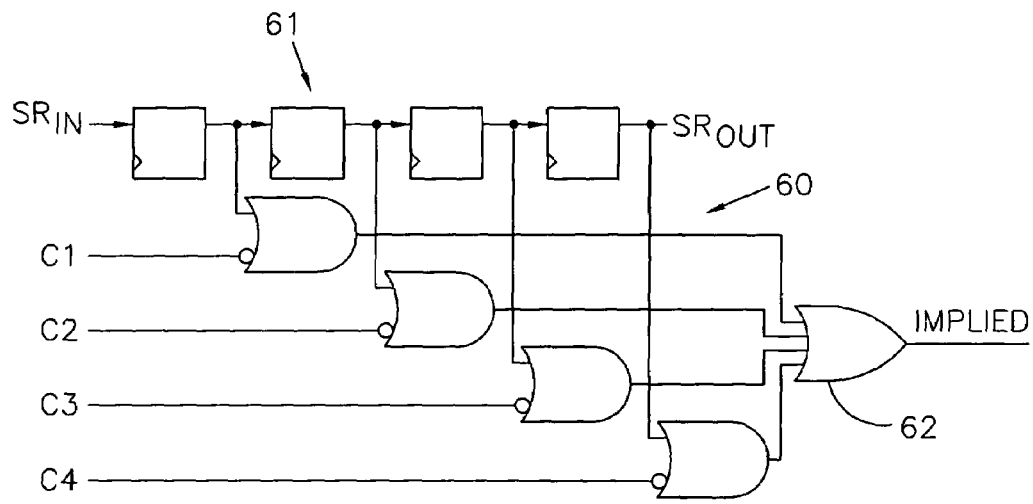
FIG. 6 is a diagram of a variable evaluation circuit as used in the encoder of an embodiment in accordance with the present invention.

FIG. 6 is a diagram of a variable evaluation circuit 60 as used in the encoder of an embodiment in accordance with the present invention. The CEC bus is routed to each Variable Evaluation Circuit (VEC). There is a VEC for each variable and each variable complement. Each VEC is simply an OR 62 of all lines which have propagated through the inverting bus mask 61. This is shown in FIG. 6. An asserted output indicates that at least one relevant clause has exactly one free variable. The FSM takes this input, and if the variable is free, it becomes implied. If a variable is free and both the variable and its negation are implied simultaneously, this is detected as a contradiction by the FSM portion of the satisfier.

Figure 7:
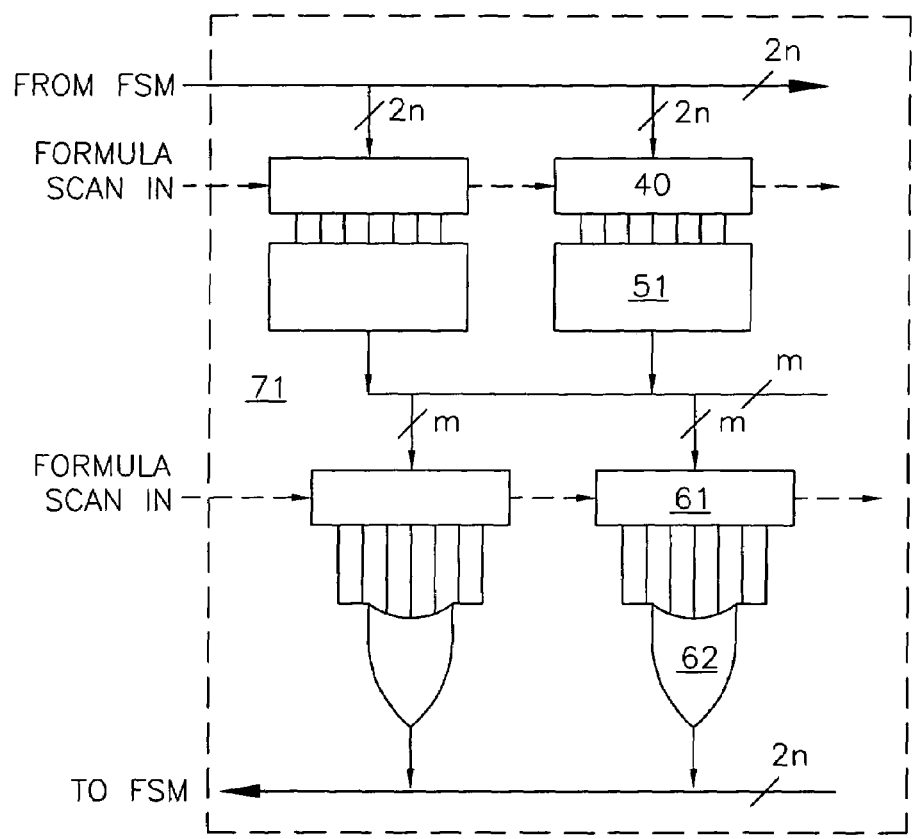
FIG. 7 is a diagram of a ELVIS subcomponents and wiring of an embodiment in accordance with the present invention.

FIG. 7 is a diagram of a ELVIS 71 subcomponents and wiring of an embodiment in accordance with the present invention and shows a detailed block diagram of ELVIS which illustrates the logical interconnect of the design.

Figure 8:
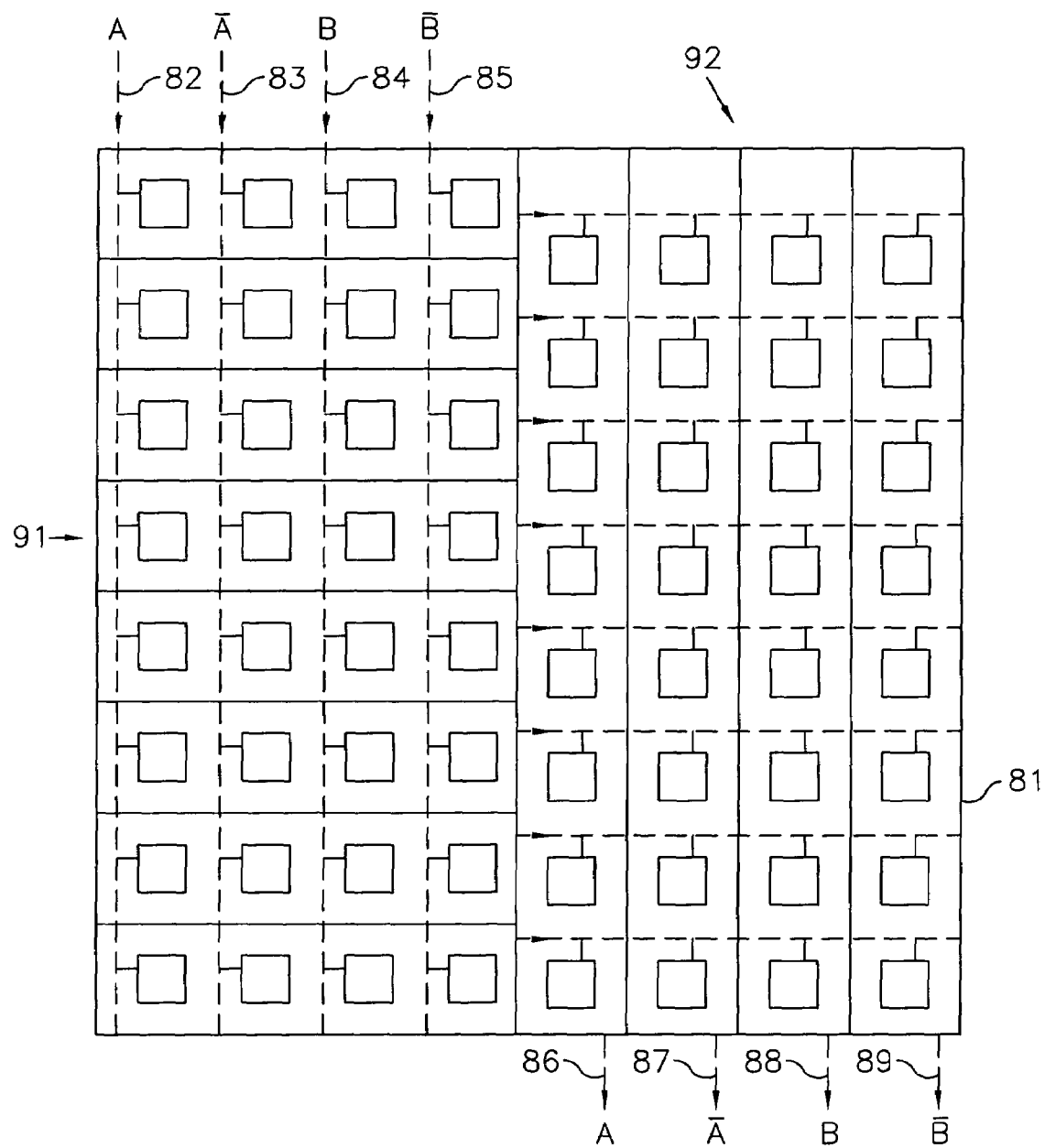
FIG. 8 is a diagram of ELVIS PLD layout of an embodiment in accordance with the present invention.

FIG. 8 shows the physical layout 81 of ELVIS which distributes the routing, logic, and state requirements of the design in a regular, easily realized integrated circuit footprint. The regular bus structure of the design allows very regular routing, fan-in 82-85, and fan-out 86-89 of bus lines and CEC/VEC circuits. The variable bus is universally routed to the CECs 91, and the clause bus is universally routed to the VECs 92. The design uses 8(n) space complexity CEC circuits and 8(m) space complexity VEC circuits. Since there are m CEC circuits (each with 2n inputs) and 2n VEC circuits (each with m inputs), the logical space complexity is 2 nm+2 nm, which is 8(nm). Since there exist SAT formulas of m variables and n clauses which require O(nm) space for their description alone (when k~n), ELVIS is also asymptotically space optimal; the design is the smallest possible which can solve all problems with the parameters m, n. Results of creation of a small m=16, n=16 ELVIS from three chips are given later in this application.

ELVIS has characteristics in common with several types of familiar computing structures. One example is a traditional Pill. ELVIS uses pre-placed routing, which is then customized by masking the unwanted signals. Additionally, the two-level logic is largely an AND-OR structure. Another similar computing device is a content addressable memory (CAM). In fact, ELVIS is a type of custom CAM, and illustrates that an efficient CAM has the same number of address lines as data lines (in this case the address lines are the partial truth assignment inputs and the implications are the data). This is clear because the size of the CEC level is the same size as the VEC level, so that reducing the size of either cannot asymptotically decrease the size of the CAM. Since the hardest SAT problems seem to have a m/n ratio of about 4.2, the CAM configuration of ELVIS is fairly efficient for these "hard" problems, since the signal latency for the fanout of the m bus roughly matches the signal latency of the fanout of the n bus. ELVIS is not a ternary CAM, but rather a majority CAM, since ELVIS returns a bit when any single bit is not matched, rather than the one particular bit.

Although parallelism provides excellent speedup, scalability is what provides for practical implementation. PRISCILA (partitionable, Reloadable, Implication Solving Clause Independent Logic Array) is a design which partitions elements of the ELVIS in a non-obvious way. Instead of partitioning the design into chips which have a few clauses or variable sums, PRISCILA computes partial sums and partial products in each chip. Each chip then scales seamlessly because the logic and memory area required scales asymptotically as the square of the required interconnect. This design then matches the asymptotic scalability of the non-partitioned ELVIS design.

Early attempts at partitioning this polynomial satisfier, ELVIS, did not allow scalability of the interconnect. Placing only a few clauses in each chip still required all of the variable signals as input. Sorting the clauses to minimize the number of variables required as input also solves nothing; this arrangement is not general enough for all possible problems. Furthermore, any rearrangement of the inputs to the device in a configware approach used the main memory of the serial processor as a virtual full crossbar itself, which scales no better than the original ELVIS design, but with the added disadvantage of limiting k to a small constant.

By scaling the width of Clause Evaluation Circuits and placing fewer CECs on each chip, in the correct proportion, the original design of ELVIS is scaled to a multi-chip design while maintaining the original asymptotic area and routing requirements. The same technique works identically well for the VEC circuits.

This following discussion demonstrates the partitioning of the design into four CECs and four VECs, with explanations of how partitioning into any number of chips is easily scaled. ELVIS seamlessly partitions into a multi-chip PRISCILA design by partitioning the larger design simultaneously into partial sum and partial product components, as has been done with our implementation.

Instead of having each chip contain fewer CECs or VECs, scalability of interconnect is achieved by splitting each CEC or VEC into p parts. For example, if there are 256 variables and 256 clauses in a sample problem, the total area required is on the order of 65 k. On a single chip, the problem would have interconnect $\Theta\sqrt{mn}$. Now assume each chip has only area 256. We would need 256 chips to provide the required area. If we simply put one CEC on each of 256 chips, we would need 256 variable inputs for each chip. This means the ratio of interconnect to area is 1:1. This is not acceptable. Instead we can put 16 partial CECs, each with only 16 variable inputs, on each chip. Now each chip has the total area of 256, with interconnect of $\Theta\sqrt{mn/p}$. This restores interconnect of the partitioned chips to the correct ratio, the same ratio as the original ELVIS design, $\Theta\sqrt{mn}$. This is shown clearly in Table 1.

TABLE 1

IO Requirements per Chip

| Variables N | Clauses M | # of chips p | I/O required by each chip |
|---|---|---|---|
| 256 | 256 | 256 | 16 |
| 256 | 256 | 64 | 32 |
| 256 | 256 | 16 | 64 |
| 256 | 256 | 4 | 128 |
| 64 | 64 | 16 | 16 |
| 32 | 32 | 4 | 16 |

The ELVIS design, in practice, uses two lines for each variable and two lines for each clause to encode the values, so each n and m calculation should be doubled to provide accurate numbers, but the asymptotic scalability is unchanged. Another modification is that each chip has two input buses for forwarded data, which are the size of the other two busses, so the calculated I/O must be increased by a constant of 8 to accommodate encoding and dual-input forwarding. This is excluded from Table 1 for the sake of clarity.

Figure 9:
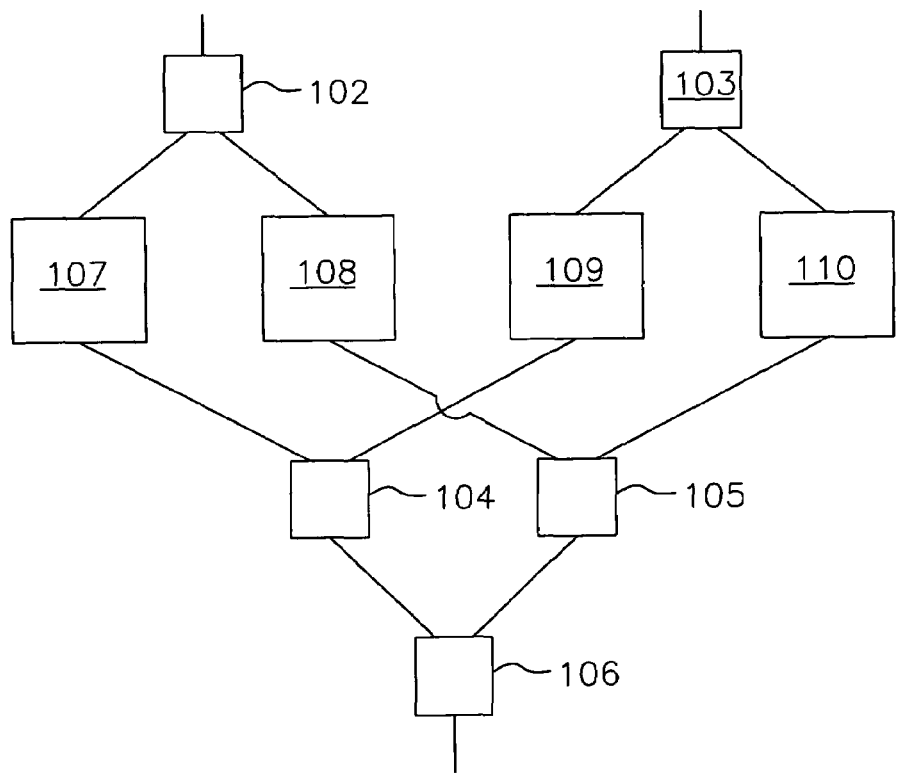
FIG. 9 is a diagram of a partitioned clause evaluation level as used in the encoder of a second embodiment in accordance with the present invention.

Clauses are evaluated at the first level of logic 101 as shown in FIG. 9. The fan-in 102-103 and fan-out 104-106 are subtly different from the first ELVIS design, since the fan-out of the first four variables (n=1 . . . 4) is only required to route to the two leftmost partial CECs 107, 108. In the original design, the variable fan-out is spread to each of the complete CECs, meaning a particular variable input signal occurs every n inputs, rather than every n/p inputs. Notice that the CEC circuits 107-110 still contain all of the equation memory; the fan-in logic is the same for every SAT equation. The fan-in and fan-out logic add nothing to the asymptotic size of the circuit. This is consistent with previous results.

Figure 10:
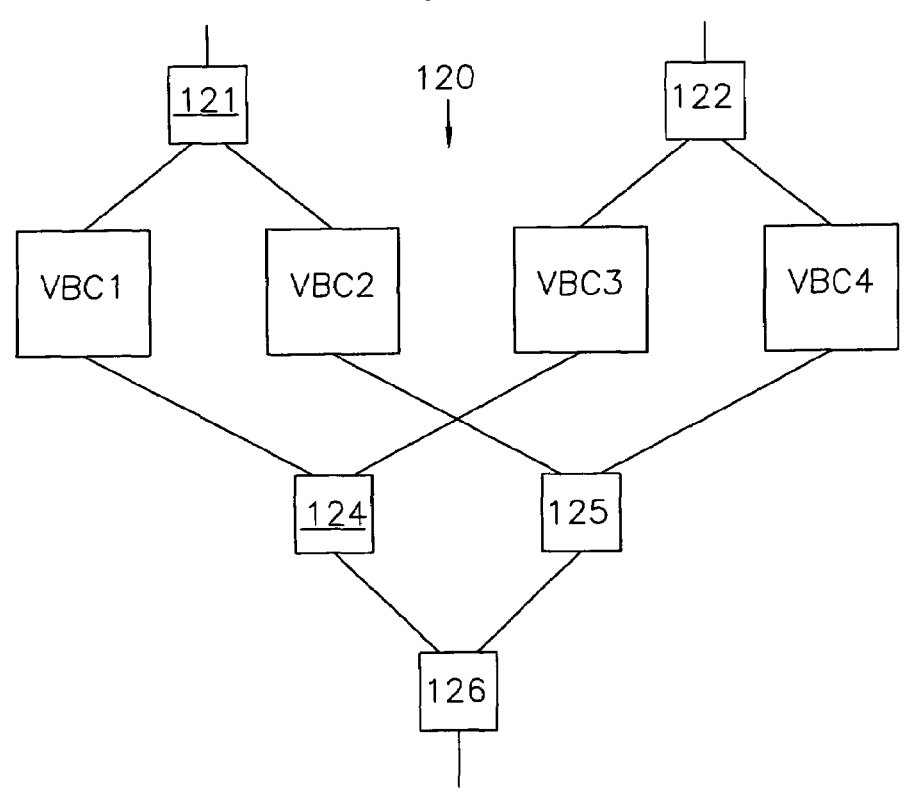
FIG. 10 is a diagram of a partitioned variable evaluation level as used in the encoder of a second embodiment in accordance with the present invention.

Variable implications are evaluated at the first level of logic 120 as shown in FIG. 10. The fan-in logic 121, 122 for each variable is simply an OR gate (for the inputs to each variable 121 and it's complement 122). Again the fan-in 121 122 and fan-out logic 124-126 are subtly but critically different from the original ELVIS design. In practice, the physical layout can be viewed as a rectangle. The state machine generates a partial variable assignment which is distributed to the Clause Evaluation Circuits (CECs).

Figure 11:
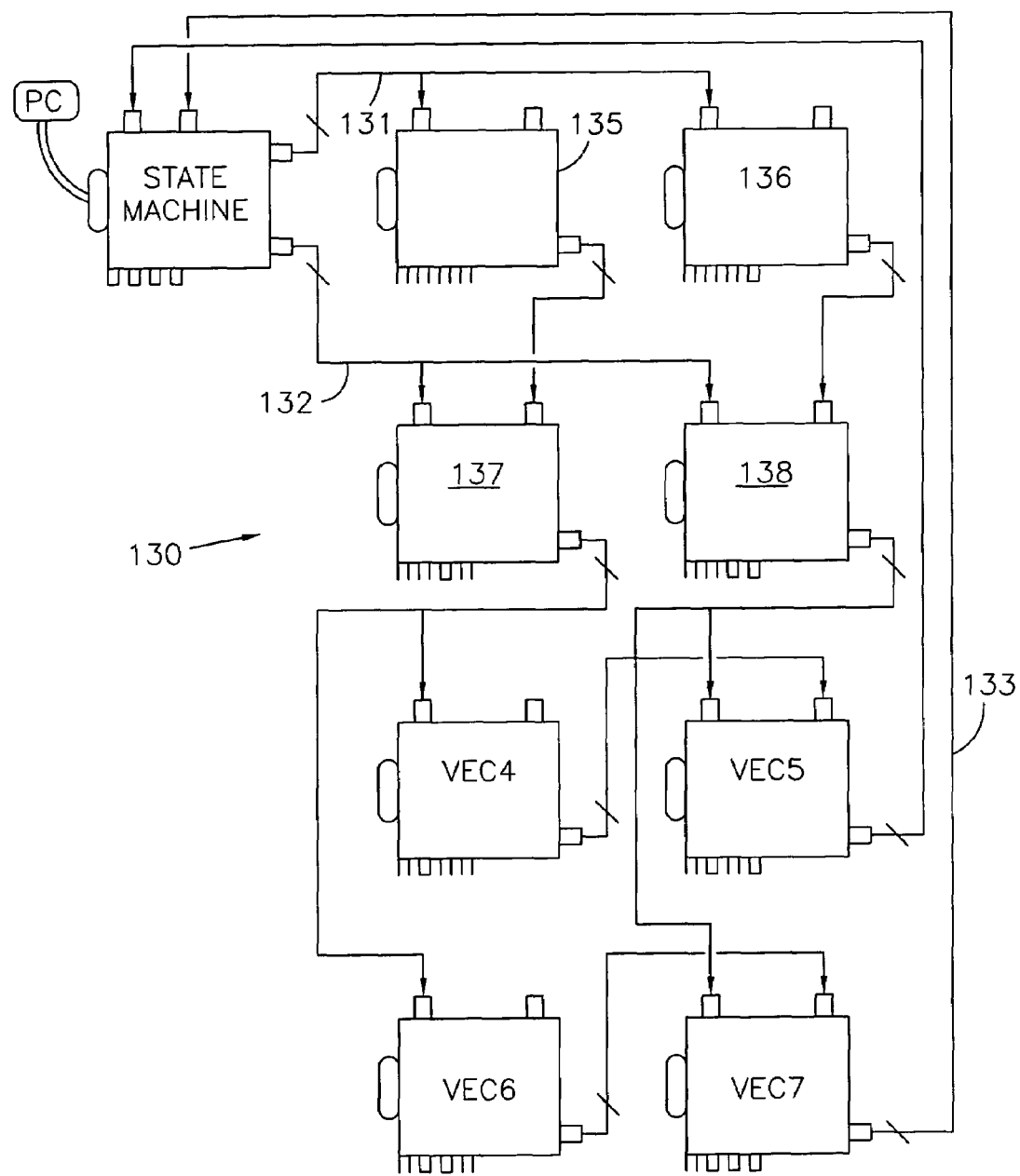
FIG. 11 is a diagram of a partial variable assignment interconnection of clause evaluation circuits as used in a second embodiment in accordance with the present invention.

In FIG. 11, the details of the interconnect 130 are shown. Each inter-chip cable 131 134 is a bus with 40 wires, 32 of which are used for clause or variable data. In this implementation, each CEC 135-138 (or partial CEC) generates a two bit output that is slightly different from the ELVIS design, as shown in Table 2.

TABLE 2

| Variables | High bit | Low bit |
|---|---|---|
| Many free | 1 | 0 |
| One active | 1 | 1 |
| None active | 0 | 0 |

Figure 12:
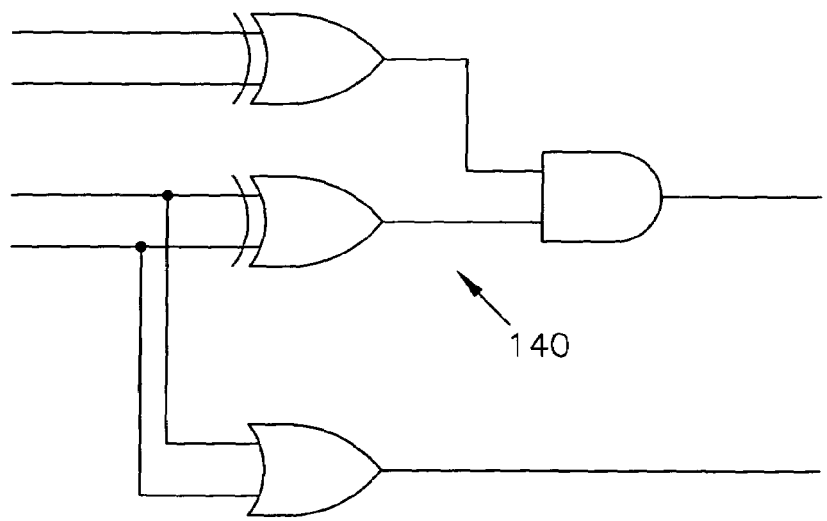
FIG. 12 is a diagram of logic for encoding ONEACT as used in a second embodiment in accordance with the present invention.

FIG. 12 also describes this logic 140. This is needed because the information forwarded to the follow-on CEC requires three possible values for the partial result so far: many active, one active, or none active. This necessitates at least two bits to encode.

Figure 13:
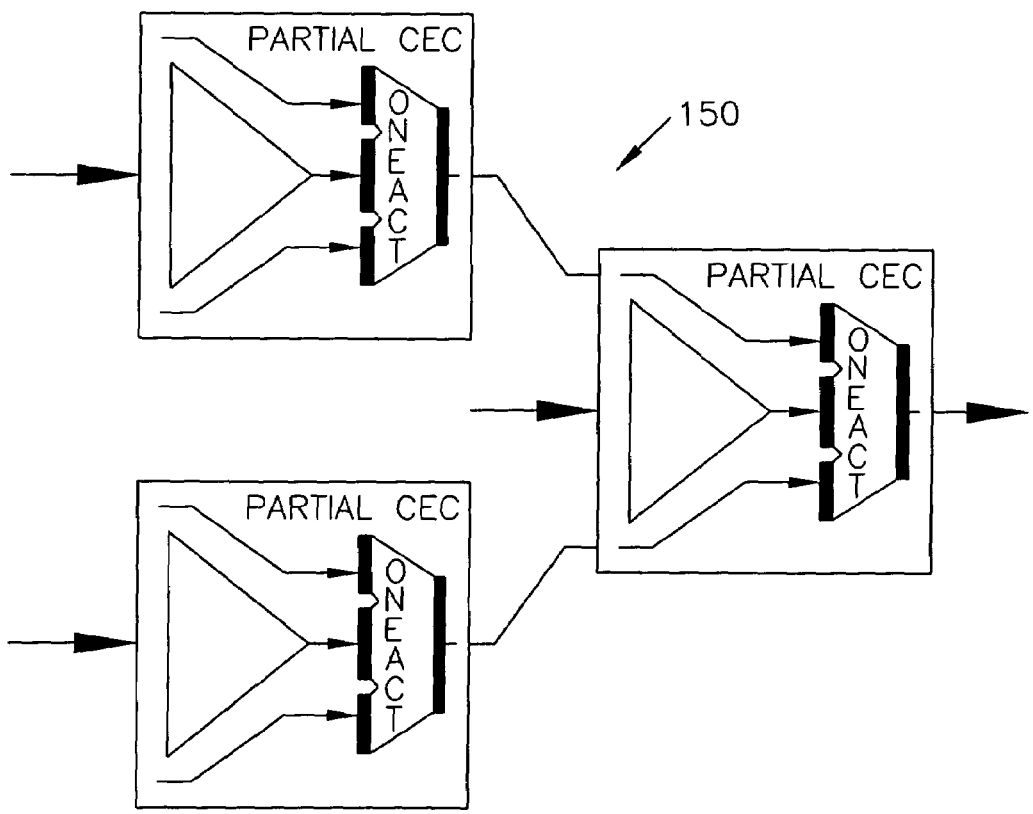
FIG. 13 is a block diagram for merging logic as used in a second embodiment in accordance with the present invention.

The encoding allows the CEC to generate the signal contra, described later, using only the high bits. It also generates a single low bit for the one-act value, halving the I/O required from the CEC to its respective VEC. Each clause (or partial clause) generates two signals. For our implemented version of PRISCILA, we assume a (partial) CEC takes 16 variables and generates the (partial) output of 16 clauses. This means there are 32 input lines (for each of 16 variables and their complements) and 32 output lines (two lines for each clause). There are also 32 other input lines which are the forwarded values from a previous partial CEC, if any. This allows fan-in of CECs without the need for additional external dedicated fan-in logic. In addition to these signals needed for implication, each CEC accepts as input on the variable bus three other signals. Although chaining of inputs was used for the forwarding in this design, resulting in an additional level of logic for each chip added, alternately each chip could receive two forwarding buses instead of one. This allows the PRISCILA design to merge and fan-in two forwarded inputs, at the last level of merging logic 150 on the chip, with the results from that chip, as shown in FIG. 13. This doubles the input pins required for each chip from 32 to 64 (two forwarding input busses). In this way PRISCILA can maintain the scalability of e(logn) levels of logic used to generate the output through the CEC. The same technique for a VEC can be used, by merging two forwarded results into an OR gate, to maintain the logic level scalability of the VEC.

The first two signals are the formula scanin and scan clock signals. These are passed as part of the output as well, ensuring they are distributed to every CEC and VEC. Each chip receives this broadcast signal, and scans in the bitstream. After passing through 512 flip flops, address recognition logic compares the bit stream header with the address from external, uniquely configured jumpers on each chip, as shown in FIG. 11 at port B. Any match disables the scan chain, retaining the current stream until the address again appears at the first few inputs of the chain.

Scanin is possible because the program which translates the cnf files to unary bitstreams also checks to ensure there are no tautologies, such as $(A+\tilde{\ }A)$. With no tautologies allowed, the bitstream is guaranteed to have no more than two bits asserted in a row, allowing the use of unique recognizable addresses by prepending a longer string of asserted bits.

The third signal is unique to the PRISCILA design. Each partial CEC generates it's own summary contra signal. This is simply a wide NAND function of all the low bits of output. This signal is only forwarded from the last CEC for each clause, and is sent to the VEC, which simply passes it through until it is eventually OR'd with the contra signals from the state machine to generate the global contra signal. The major difference is that the CEC contra is generated if all the literals in the clause are negated, thereby making the clause false. This is distinct from the state machine contradiction signal, which is generated when both a variable and it's complement are driven to a logical high, as shown previously in the formula:

$$(T+B+T)(F+\tilde{\ }B)(\tilde{\ }B+F)(F+B+F)$$

The need for this distinctly generated contra signal is shown by the following example. Assume A is asserted in the equation:

$$(\tilde{\ }A+B)(\tilde{\ }A+C)(\tilde{\ }A+D)(\tilde{\ }B+\tilde{\ }C+\tilde{\ }D)$$

The literals B, C, and D are simultaneously implied in the next cycle, as shown in the equation:

$$(F+B)(F+C)(F+D)(\tilde{\ }B+\tilde{\ }C+\tilde{\ }D)$$

In the very next cycle, all three literals in the equation below are driven false:

$$(F+B)(F+C)(F+D)(F+F+F)$$

Therefore the final clause is false and the clause contra signal is driven high. This extra signal is critical because all three literals are falsified simultaneously, so no one act signal is ever generated for these variables and no contra signal is ever generated by the individual variable state machines. If this signal were not included, the falsified clause and the need to backtrack to satisfy it would not be recognized by the state machine. Because this contradiction is handled in the same manner as when a variable and its complement are asserted simultaneously, the signal is simply merged downstream with the other contra signals and the state machine logic handles it accordingly.

The VECs function in very much the same manner as the CECs, with a very slight difference in the contra signals. The contra signals are merged by an OR of the contra signal forwarded from a CEC with the contra signal forwarded from a previous VEC and then passed along. The other internal logic differs from the CEC as detailed before (it's a wide OR gate instead of a oneact encoder), but otherwise the two devices are similar. Each VEC accepts forwarding signals from previous VECs, accepts CEC clause one-act encodings, scans in bitstreams, and generates output on the same scale as the CEC.

Both ELVIS and PRISCILA were designed and implemented on Digilent D2E prototyping boards, using Xilinx xc2s200e-pq208-6 devices. For the PRISCILA design, 12 of these boards were connected via 40 line ribbon cable. The resulting circuit was able to calculate implications for problems of up to n=32 variables and m=48 clauses, which allowed for solutions of the five smallest benchmark problems created from the Dubois gensathard.c[18] and Pretolani TRISAT.c[35] generators. To test the PRISCILA design, a Digilent D2 board with Xilinx xc2s200-pq208-6 device was used to implement state machines and structure which was similar to, but subtly different from, the Princeton solver described in *Proceedings of the IEEE Symposium on Field Programable Custom Computing Machines*, pages 186-195 April 1998 by Zhong, Martonosi, Asher, and Malik.

In this somewhat different implementation, the implication is determined by ANDing the oneact signal with the negation of the flip-flop output of its variable complement. Furthermore, the local signals are joined to the global bus by fan-in or gates, instead of a wired-OR. Another difference between this state machine design and the Princeton solver described in *Proceedings of the IEEE Symposium on Field Programable Custom Computing Machines*, pages 186-195 April 1998 by Zhong, Martonosi, Asher, and Malik is that the state machine board has state machines for each variable matching the size of it's associated PRISCILA circuit, regardless of the size of the actual problem to be solved. This means that a 32 variable PRISCILA has 32 state machines, regardless of the fact the problem may be very small. Because of this, each Unused variable takes three extra cycles: one to receive control, one to determine no changes are caused by the variable assertion, and one to pass control right. This causes interesting cycle times when solving satisfiable formulas and comparing results to software satisfiers (for which delay is independent of selection of the next variable to assert).

Finally, a second board was used to track the statistics of the state machine, including number of cycles, contradictions, and implied assignments. This purely passive test board allowed testing with no impact on the timing of the state machine. The timing delays of the partitioned PRISCILA device involved pad to pad delays through gates and wiring on chip, delay through the lines of the prototype board, and delays through the lines of the ribbon cables used to connect the boards. These estimated timing specifications are shown in Table 3.

TABLE 3

| Device Delay | 23 ns |
|---|---|
| Wiring Delay | 20 ns |
| Board Delay | 12 ns |
| State Machine Delay | 15 ns |

Initial tests were run for all of the results in Table 3. When dubois6 was run, the device would fail intermittently and produce a false (satisfying) assignment. Intermittent faults are generally associated with an open. causing a hi-z state which takes the value of nearby transient signals. Initially it was suspected this was caused by connections at the unterminated inputs of the leading CECs and VECs (which have no accepting forwarded inputs), so those pins were configured with pull down resistors (at this point all the jumper pins were configured with pulldowns as well, for similar reasons). However, the intermittent false results continued, and eventually, when the problem boyd16n from Appendix J was tested at less than IHz, the 14th variable was found to not assert correctly. To diagnose the fault, the incorrect output was traced back to before the VECs, using a custom LED "bed of nails" tester. Finally, the jumpers on the CEC boards were switched to determine which CEC was generating the faulty output. The output connection of that board was checked, and the 14th output pin was found bent and not contacting. This was repaired and no further anomalies were found. To roughly verify the timing, PRISCILA was implemented with four boards (tester the tester delays were not added, as the tester was purely passive, state machine, CEC and VEC) and n=16, m=16. The design worked properly when tested with dubois2 and pret6 50 n benchmarks at 6.25 mHz, but failed to find either problem unsatisfiable at 12.5 MHz. This is consistent with the calculated 157 ns total delay through the circuit, and a 6.37 MHz maximum clock period.

When implemented with the 14 board design (tester, state machine, 6 Partial CECs, 6 partial VECs) and n=32, m=48, more at speed tests were run. The longest path traverses 3 CECs, 3 VECs, and the state machine. From the timing results in Appendices C through H, plus the board and ribbon cable stated specifications, this yields a calculated delay of 323 ns, and a possible 3.10 MHz maximum clock period. The design failed to give correct results for all problems when run at speed at 3.12 MHz, and passed all tests (yielding an unsatisfiable result and correct cycle count) at 1.56 MHz, again consistent with expectation. On a circuit with a clause to variable ratio of ~2:1. this produces a 10 ns per variable delay.

In terms of area consumed, each n=16, m=16 CEC or VEC chip showed about an 8000 gate resource count. This corresponds to a constant of around 32, meaning large implementations should require about 32 mn gates. A manufactured chip with about 16 million gates implementing ELVIS could solve problems of size n=512 and m=512, or be united with other identical chips to form a PRISCILA circuit for whatever larger capacity is required. The most modem software solvers were recently unable to solve a random instance hgen8-n260-01 [26] with n=260 and m=391, a problem an ELVIS or PRISCILA would undoubtably speed up. In summary, once some minor construction errors were diagnosed and corrected the implemented PRISCILA design worked exactly as theoretically predicted, and provided significant speedup on par with the results of previous researchers, without the burdensome compilation overhead.

INDUSTRIAL APPLICABILITY

The present invention applies industrially to data processing, particularly to programmable logic device systems and methods. More particularly, the present invention applies industrially to implementations that quickly evaluate the transitive implications for Boolean satisfiability (SAT) problems. Even more particularly, the present invention applies industrially to implementations that quickly evaluate the transitive implications for Boolean satisfiability (SAT) problems which are readably scalable allowing parallel processing.

What is claimed is:

1. Apparatus for solving Boolean satisfiability instances having N variables and M clauses, the apparatus comprising:
a plurality of clause evaluation circuits (CECs);
a plurality of variable evaluation circuits (VECs);
wherein said N variables are partitioned into $P \geq 2$ partial variable sets, such that each of said N variables belongs to exactly one of said partial variable sets;
wherein said M clauses are partitioned into $Q \geq 2$ partial clause sets, such that each of said M clauses belongs to exactly one of said partial clause sets;
wherein each of said CECs has as inputs the variables of one of said partial variable sets, and provides CEC results for the clauses of one of said partial clause sets;
wherein each of said VECs has as inputs said CEC results for the clauses of one of said partial clause sets, and provides VEC outputs for the variables of one of said partial variable sets;
wherein said CEC results provide an indication, for each clause, of the number of free variables in the clause (0, 1 or more than 1), and whether or not the clause is in contradiction;
wherein said VEC outputs provide identification of which variable is asserted in any clause having a CEC output of 1 free variable.

2. The apparatus of claim 1, wherein said CECs include a shift register and at least one inverting AND gate associated with said shift register.

3. The apparatus of claim 1, wherein said CECs include a cascade of bit adders.

4. The apparatus of claim 3, wherein said CECs encoder include a cascade of 2 bit adders for summing all bus lines and forwarding the sum to a maximum value of 3 such that 0 indicates the clause is false since all of the literals have their compliments asserted and are dead, 1 indicates a single implied literal as all literals are dead except for one that is free and active and 2 and 3 indicate that the clause has more than one free variable.

5. The apparatus of claim 1, wherein said VECs comprise, for each of said N variables, an OR of said VEC outputs for all of said clauses.

6. The apparatus of claim 1, wherein loadable bus masks are employed to define said CECs with respect to a bus including all of said N variables.

7. The apparatus of claim 1, wherein said CEC inputs include a forwarded partial CEC result.

8. The apparatus of claim 1, wherein said VEC inputs include a forwarded partial VEC result.

9. The apparatus of claim 1, further comprising a state machine for generating a partial variable assignment for distribution to said clause evaluation circuits.

10. The apparatus of claim 1, wherein each partial clause evaluation circuit generates an individual summary contra signal distinct from a state machine contradiction signal.

* * * * *